(12) United States Patent
Smith

(10) Patent No.: US 7,685,107 B2
(45) Date of Patent: Mar. 23, 2010

(54) APPARATUS, SYSTEM, AND METHOD FOR SCANNING A PARTITIONED DATA SET

(75) Inventor: Alan Ray Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/146,630

(22) Filed: Jun. 7, 2005

(65) Prior Publication Data

US 2006/0277164 A1 Dec. 7, 2006

(51) Int. Cl.
*G06F 17/30* (2006.01)
*G06F 9/44* (2006.01)

(52) U.S. Cl. ......................................... 707/3; 717/107

(58) Field of Classification Search ................ 395/603, 395/617; 365/49; 714/6; 707/200, 205
See application file for complete search history.

(56) References Cited

U.S. PATENT DOCUMENTS

| | | | | |
|---|---|---|---|---|
| 5,134,696 A * | 7/1992 | Brown et al. | .................... | 711/3 |
| 5,247,647 A * | 9/1993 | Brown et al. | .................... | 714/1 |
| 5,471,615 A * | 11/1995 | Amatsu et al. | .............. | 709/202 |
| 5,623,669 A * | 4/1997 | Kincaid | ....................... | 707/205 |
| 5,710,915 A * | 1/1998 | McElhiney | .................... | 707/3 |
| 5,790,848 A * | 8/1998 | Wlaschin | .................... | 707/201 |
| 5,872,970 A * | 2/1999 | Pickett et al. | ............... | 718/101 |
| 6,003,036 A * | 12/1999 | Martin | ....................... | 707/102 |
| 6,115,705 A * | 9/2000 | Larson | ......................... | 707/3 |
| 6,185,575 B1 * | 2/2001 | Orcutt | ........................ | 707/200 |
| 6,216,125 B1 | 4/2001 | Johnson | ......................... | 707/4 |
| 6,480,834 B1 * | 11/2002 | Engle et al. | ..................... | 707/2 |
| 6,484,161 B1 | 11/2002 | Chipalkatti et al. | ............ | 707/3 |
| 6,636,853 B1 * | 10/2003 | Stephens, Jr. | ................ | 707/10 |
| 6,957,364 B2 * | 10/2005 | Shimooka et al. | ............. | 714/25 |
| 6,978,291 B2 * | 12/2005 | Vardi et al. | ................. | 709/202 |
| 6,985,951 B2 * | 1/2006 | Kubala et al. | ............... | 709/226 |
| 7,089,558 B2 * | 8/2006 | Baskey et al. | ............... | 718/104 |
| 7,188,062 B1 * | 3/2007 | Rieschl et al. | ................ | 703/23 |
| 7,194,439 B2 * | 3/2007 | Kassan et al. | ................. | 705/51 |
| 2002/0075714 A1 * | 6/2002 | Pereira et al. | ................. | 365/49 |

(Continued)

OTHER PUBLICATIONS

IBM redbook: Partitioned Data Set Extended Usage Guide, May 2005.*

(Continued)

*Primary Examiner*—Neveen Abel Jalil
*Assistant Examiner*—Tarek Chbouki
(74) *Attorney, Agent, or Firm*—Kunzler Needham Massey & Thorpe

(57) ABSTRACT

An apparatus, system, and method are disclosed for scanning a partitioned data set ("PDS"). A receive module is included to receive a search criteria comprising one or more expressions. A member module is included to determine a set of PDS members to search based on the search criteria. A scan module is included to scan a record contained within each member of the set of PDS members. A determination module is included to determine whether a record satisfies the search criteria, where the search criteria comprises at least one expression that identifies a record that lacks a specified character string of the at least one expression. A return module is included to return the determined record. Each record in the scanned PDS has any length within a range supported by an operating system maintaining the scanned PDS.

25 Claims, 6 Drawing Sheets

U.S. PATENT DOCUMENTS

| | | | |
|---|---|---|---|
| 2002/0108074 A1* | 8/2002 | Shimooka et al. | 714/25 |
| 2002/0138464 A1* | 9/2002 | Calascibetta | 707/1 |
| 2002/0161717 A1* | 10/2002 | Kassan et al. | 705/59 |
| 2003/0097357 A1* | 5/2003 | Ferrari et al. | 707/3 |
| 2003/0188220 A1* | 10/2003 | Misra et al. | 714/6 |
| 2005/0102270 A1* | 5/2005 | Risvik et al. | 707/2 |
| 2005/0154664 A1* | 7/2005 | Guy et al. | 705/35 |
| 2006/0253317 A1* | 11/2006 | Young et al. | 705/12 |

OTHER PUBLICATIONS

Author: IBM international Technical Support Organization, title:"TME 10 Information/Management Version 1.1 Performance and Capacity Considerations", date:Sep. 1997, pp. 22,34, 48, 77, 81 and 96.*

PKWARE, Inc, "PKZIP MVS, MVS/ESA, OS/390, &z/OS" Nov. 18, 2002, p. 156.*

Mary Lovelace, Anthony Fletcher, Dirk Gutschke and Massimo Mastrorilli, "Partitioned Data Set Extended Usage Guide", May 6, 2005.*

Office of the Chief Financail Officer , "Interactive System Productivity Facility (ISPF)", Sep. 2003.*

Leahy, Don "SimpList" Technical Support, Feb. 2005.

"Xephon Archives" (http://www.wephon.com/arcinframe.php/m045a08).

"The search Engine for OS/390" (http://www.princesoftware.com/pages/superfind.html).

"SCANPDS—Search and Cross-Reference PDS Members" (http://gsf-soft.com/Products/SCANPDS.shtml).

* cited by examiner

APPARATUS, SYSTEM, AND METHOD FOR SCANNING A PARTITIONED DATA SET

BACKGROUND OF THE INVENTION

1. Field of the Invention

This invention relates to scanning a partitioned data set ("PDS") and more particularly relates to scanning a PDS with multiple expressions including expressions to exclude character strings.

2. Description of the Related Art

Operating system utilities for mainframe computers generally run in a foreground environment, a batch environment, or a combination of both. When a utility is invoked, the results of the invocation are generally presented to a display on a terminal where the utility was invoked, stored in a permanent file such as a data set, or a combination of both. The resulting data set can be stored in a database such as Information Management System ("IMS"), DB2®, or Oracle®, may be a Virtual Storage Access Method ("VSAM") data set, or may be a PDS that is typical of a z/OS data set.

A PDS is a data structure and is typically used in conjunction with a mainframe computer. A z/OS operating system is a typical example of an operating system that makes use of a PDS. A PDS typically contains members which are indexed. Each member is typically made up of records. A record in a PDS is typically made of a character string of a fixed length that is assigned during initialization of the PDS. A common record length is 80 characters, but a record may be of any length allowed by the operating system supporting the PDS.

A PDS may be generated from a query of a database. For example, an IMS database used for banking may be accessed using a utility to generate bank statements and the statements may be stored in a PDS. The statements may be accessed later for further processing. For example, among the information extracted from a database may be a customer's name, address, phone number, account balance, etc. If an area code is changed, the one or more PDSs containing the statements may be required to be accessed to retrieve all statements with the affected area code. The selected records in the PDS of statements may then be changed to reflect the current area code before the statements are sent.

Time Sharing Option ("TSO") is an interface program that allows a user to enter and run commands on a mainframe computer operating system through a terminal. The terminal may take the form of a dedicated terminal or may be a personal computer. Interactive System Productivity Facility ("ISPF") is a utility that makes TSO easier to use. ISPF offers menus to select functions and parameters. Tasks can be completed from the terminal or submitted as a batch job using Job Control Language ("JCL").

While ISPF and other similar front-end utilities are useful in processing a PDS, currently scanning a PDS for data that match certain criteria is very limited and cumbersome. There are standard utilities that run under ISPF, TSO directly, or other front-ends that allow a user to perform limited searching of a PDS, but the scan utilities are limited.

Currently, one scanning utility can scan a PDS using a single expression. The utility cannot process search criteria with multiple expressions. In addition, the utility cannot scan for records or members that exclude a particular character string. Another utility can process search criteria with multiple expressions, but is limited to a PDS with records of a fixed length of 80 characters. In addition, this utility cannot scan for records or members that exclude a particular character string. The scan utilities also cannot search members within a PDS while excluding specified members from the search. Likewise, the scan utilities cannot search records or members within a PDS while excluding specified records from the search. The scan utilities also cannot create a new member with the records returned from the scan and cannot create a new PDS with the records returned from the scan.

From the foregoing discussion, it should be apparent that a need exists for an apparatus, system, and method for scanning a PDS comprising records of any length. Beneficially, such an apparatus, system, and method would allow search criteria allowing an unlimited number of expressions, would allow various exclude functions, and would allow post processing of the results of a scan to create a new member or PDS with the records returned from the scan.

SUMMARY OF THE INVENTION

The present invention has been developed in response to the present state of the art, and in particular, in response to the problems and needs in the art that have not yet been fully solved by currently available means for scanning a PDS. Accordingly, the present invention has been developed to provide an apparatus, system, and method for scanning a PDS that overcome many or all of the above-discussed shortcomings in the art.

The apparatus to scan a PDS is provided with a logic unit containing a plurality of modules configured to functionally execute the necessary steps of scanning a PDS based on a search criteria, where the search criteria may contain expressions to exclude records with a specified character string (referred to herein as absence expressions), may contain any number of expressions, and where the records within the PDS may be of any length allowable for the operating system supporting the PDS. These modules in the described embodiments include a receive module that receives a search criteria comprising one or more expressions. A scan module is included that scans a record contained within each member of the PDS, the record having a length within a range supported by an operating system maintaining the scanned PDS. A determination module is included that determines whether a record satisfies the search criteria. A return module is included that returns the determined record.

The apparatus, in one embodiment, is configured to include a PDS update module that generates a command to create a new PDS member containing the determined record. In another embodiment, the apparatus includes a copy member module that generates a command to copy one or more PDS members containing at least one determined record to a new PDS. In yet another embodiment, the apparatus includes a copy record module that generates a command to copy one or more determined records to a new member in a new PDS. In yet another embodiment, the search criteria includes at least one expression that identifies a record that lacks a specified character string of the at least one expression.

In one embodiment, a member module is included to identify a set of PDS members designated by the search criteria. In a further embodiment, the search criteria designates PDS members to be excluded from the search. In another embodiment, the search criteria includes an expression configured to do one of exclude from the scan a specified number of characters from the beginning of the record and exclude from the scan a specified number of characters from the end of the record. In yet another embodiment, the search criteria includes an expression to scan a specified column in the record. In another embodiment, the search criteria includes an expression that identifies one or more records containing a first character string and that excludes from the one or more identified records a record containing a second specified character string.

The apparatus is further configured, in one embodiment, to include a record list module that creates a list of at least one determined record. The apparatus, in another embodiment, includes a member list module that creates a list of one or more members that include at least one determined record. In another embodiment, the apparatus includes a sequential file module that generates a sequential file of at least one determined record.

In one embodiment, the receive module reads a file containing the search criteria. In another embodiment, the receive module further receives the search criteria from a terminal. In one embodiment, the search criteria contains an expression comprising a character string having a blank character. In another embodiment, the receive module receives the search criteria through a terminal using an Interactive System Productivity Facility ("ISPF").

A system of the present invention is also presented to scan a PDS. The system may be embodied by a scan PDS utility on a mainframe computer. In particular, the system, in one embodiment, includes a processor and a terminal coupled to the processor and configured to permit a user to provide search criteria. The system includes a memory coupled to the processor, where the memory includes a receive module that receives the search criteria comprising one or more expressions. The memory includes a member module that determines a set of PDS members to search based on the search criteria and loads the set of PDS members into the memory. The memory includes a scan module that scans a record contained within each member of the set of PDS members in the memory. The memory includes a determination module that determines whether a record satisfies the search criteria, where the search criteria comprises at least one expression that identifies a record that lacks a specified character string of the at least one expression. The memory includes a return module that returns the determined record and presents the determined record using the terminal. In one embodiment, each record in the scanned PDS has a length within a range supported by an operating system maintaining the scanned PDS.

A method of the present invention is also presented for scanning a PDS. The method in the disclosed embodiments substantially includes the steps necessary to carry out the functions presented above with respect to the operation of the described apparatus and system. In one embodiment, the method includes receiving a search criteria comprising one or more expressions, determining a set of PDS members to search based on the search criteria, scanning a record contained within each member of the set of PDS members, determining whether a record satisfies the search criteria, where the search criteria comprises at least one expression that identifies a record that lacks a specified character string of the at least one expression, and returning the determined record.

A method of the present invention is also presented for scanning a PDS and processing the scan results to provide results to a client in the form requested by the client. The method in the disclosed embodiments substantially includes the steps necessary to carry out the functions presented above with respect to the operation of the described apparatus and system. In one embodiment, the method includes receiving a request from a client to identify records having a specified characteristic, using a scan PDS utility to scan a PDS to identify the records having the specified characteristic, and packaging the determined record in the form specified by the client. The scan PDS utility includes a receive module that receives a search criteria comprising one or more expressions, where the search criteria is configured to identify the records having the specified characteristic. The scan PDS utility includes a member module that determines a set of PDS members to search based on the search criteria. The scan PDS utility includes a scan module that scans each record contained within each member of the set of PDS members. The scan PDS utility includes a determination module configured to determine whether a record satisfies the search criteria, wherein the search criteria comprises at least one expression that identifies a record that lacks a specified character string of the at least one expression. The scan PDS utility also includes a return module configured to return the determined record.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language throughout this specification may, but do not necessarily, refers to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
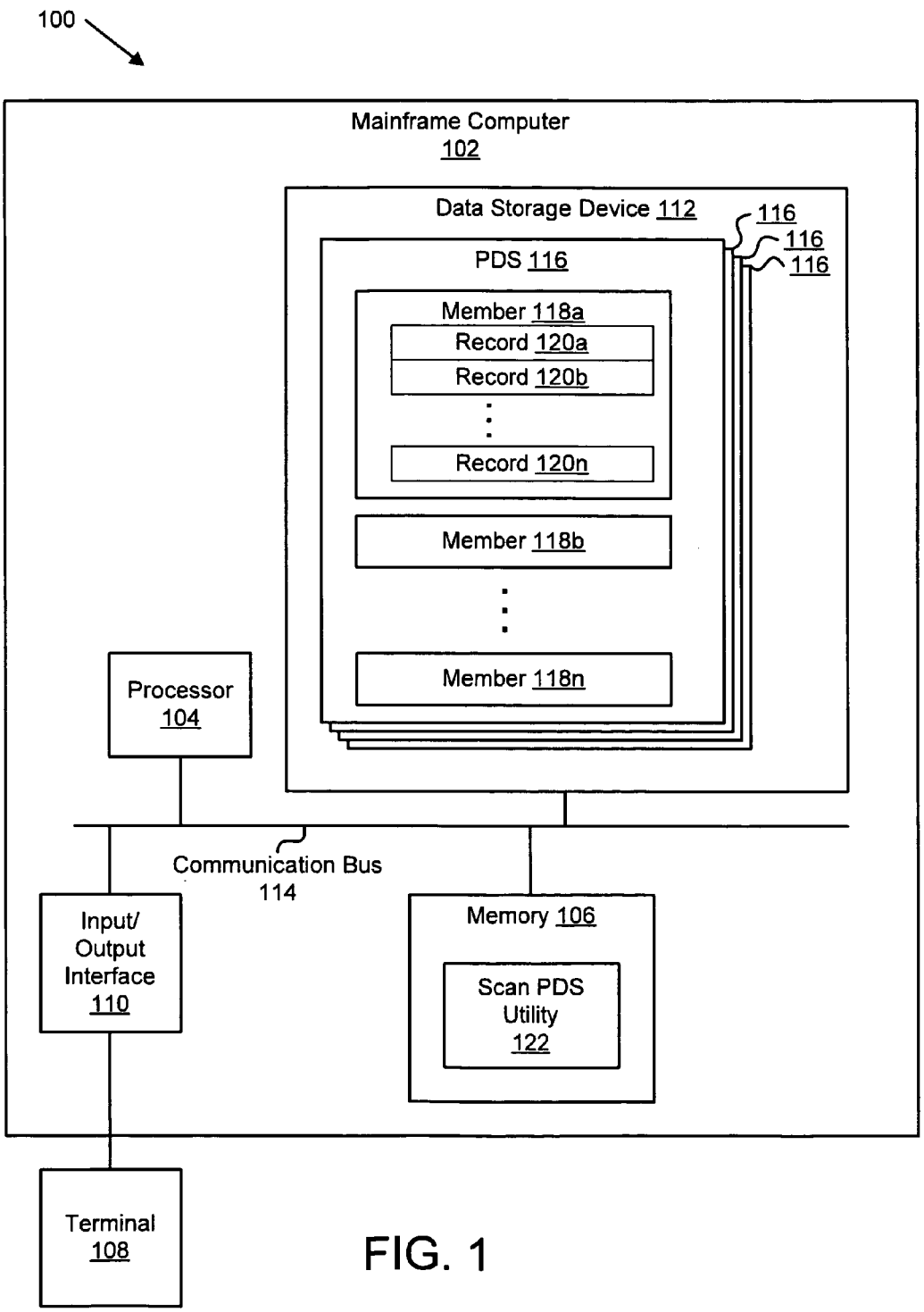
FIG. 1 is a schematic block diagram illustrating one embodiment of a system for scanning a PDS in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a schematic diagram of a system 100 for scanning a PDS in accordance with the present invention. The system 100 comprises a mainframe computer 102 with a processor 104, a memory 106, a terminal 108 accessed through an input/output interface 110, and a data storage device 112—all of which are connected through a communication bus 114. The terminal 108 may be a dedicated terminal, a personal computer, a laptop computer, or the like. The data storage device 112 may be integral to the mainframe computer 102, may be a device in a storage area network, may be a tape drive, a magnetic hard drive, an optical storage device, or may be a library storage system. One skilled in the art will recognize other data storage devices 112 where a PDS can be stored.

The data storage device 112 includes one or more PDS 116. Each PDS 116 comprises one or more members 118 and each member 118 comprises one or more records 120. Generally, the length of the records 120 within a PDS 116 are determined when the PDS 116 is created and initialized. The length of a record 120 may be defined to be any length of characters allowable within the operating system supporting the PDS 116. A typical record length is 80 characters.

The memory 106 includes a scan PDS utility 122 for scanning a PDS 116. In one embodiment, the scan PDS utility 122 receives a request from the terminal 108 to identify a specified characteristic. The scan PDS utility 122 then identifies records 120 in the PDS 116 having the specified characteristic. The scan PDS utility 122 then packages one or more determined records 120 in the form specified by a user operating the terminal 108. Details of the scan PDS utility 122 will be further described in relation to FIG. 2.

Figure 2:
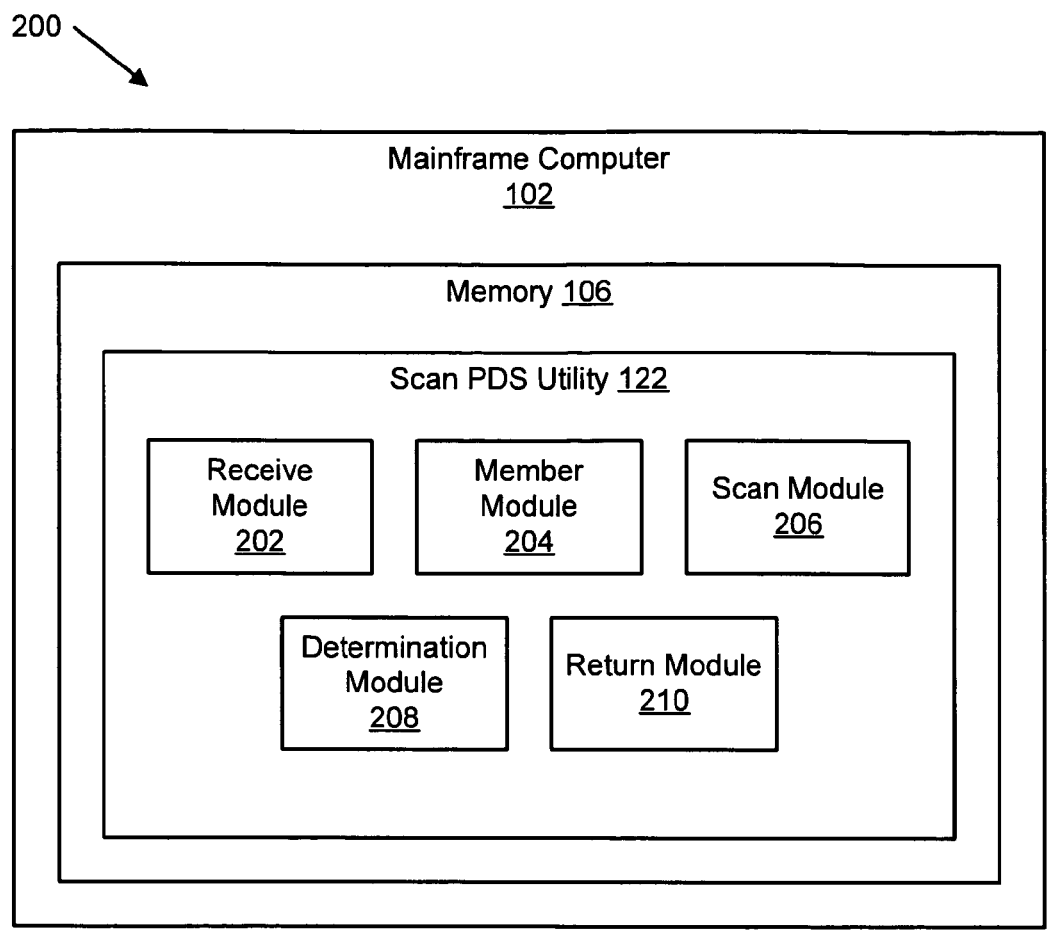
FIG. 2 is a schematic block diagram illustrating one embodiment of an apparatus for scanning a PDS in accordance with the present invention.

FIG. 2 is a schematic block diagram illustrating one embodiment of an apparatus 200 for scanning a PDS 116 in accordance with the present invention. The apparatus 200 includes a scan PDS utility 122 in a memory 106 on a mainframe computer 102. The scan PDS utility 122 alternatively may be located on a hard drive, an optical drive, a tape storage drive, flash memory, or may be partially incorporated by hardware. One skilled in the art will recognize other embodiments of a scan PDS utility 122 that may be accessed from a mainframe computer 102. The scan PDS utility 122 can scan a PDS 116 with records 120 of any defined length allowable within the operating system supporting the PDS 116. Advantageously, the PDS utility 122 can scan PDSs 116 that each have different length records 120. The PDS utility 122 is not limited to scanning PDSs 116 with records 120 having a length of 80 characters.

The scan PDS utility 122 includes a receive module 202 configured to receive a search criteria. The receive module 202, in one embodiment, receives a search criteria from a terminal 108 using TSO. In another embodiment, the receive module 202 receives a search criteria from a terminal 108 using ISPF. A search criteria received from a terminal 108 may include an unlimited number of expressions. One skilled in the art will recognize other terminal 108 front-end utilities appropriate for interfacing with a mainframe computer 102 and capable of interacting with a receive module 202 to input or designate a search criteria.

In one embodiment, the receive module 202 receives a file containing the search criteria. The file containing the search criteria may contain any number of expressions. The number of expressions in a file with the search criteria is unlimited except for any operating system constraint on file size. In another embodiment, the file is in the form of a set of JCL commands. Alternatively, the receive module 202 receives the search criteria from input at a terminal 108 by a user. In another embodiment, a user may create a file or set of JCL commands with a search criteria at a terminal 108 and then the receive module 202 receives the file or JCL command that includes the search criteria. In yet another embodiment, the receive module 202 receives the search criteria as output from another utility, function, control statement, etc. One skilled in the art will recognize other ways that the receive module 202 may receive search criteria.

The search criteria include one or more expressions. An expression may include a single character string coupled with a function to be performed such as identify records 120 that include the character string or identify records 120 that lack the character string. An expression may include a function to only search specified members 118 within a PDS 116, or may include a function to search PDS members 118 other than the specified PDS members 118. In one embodiment, an expression includes a function to exclude records 120 containing a specified character string. In another embodiment, an expression includes a function to exclude from a search of a record 120 a specified number of characters from the beginning or from the end of the record 120. In another embodiment, the search criteria includes an expression to search a specified column within the records 120.

In one embodiment, an expression may include more than one function or may include nested functions. Each function may or may not include an associated character string. One skilled in the art will recognize other expressions that include one or more functions and associated character strings where the functions may designate searching or excluding certain members 118 or records 120 in a PDS 116 and identifying records 120 for inclusion or exclusion where a specified character string is found. The search criteria are configured to identify records 120 that satisfy the expressions and thus include some specified characteristic. The search criteria may include an unlimited number of expressions.

The scan PDS utility 122 also includes a member module 204 that determines a set of PDS members 118 to scan that match the search criteria. In one embodiment, the member module 204 determines a set of all of the members 118 within the PDS 116. In another embodiment, the member module 204 determines a set of members 118 in the PDS 1116 identified by the search criteria. In yet another embodiment, the member module 204 determines a set of members 118 in the PDS 116 that includes all members 118 of the PDS 116 except those members 118 specified by the search criteria. In another embodiment, the member module 204 determines a set of PDS members 118 based on a combination of expressions within the search criteria that may include both expressions to include certain members 118 and exclude certain members 118. One skilled in the art will recognize other combinations of expressions and expression types such that the member module 204 determines a set of PDS members 118 consistent with the search criteria.

The scan PDS utility 122 includes a scan module 206 that scans the records 120 within the set of members 118 determined by the member module 204. In one embodiment, the scan module 206 scans records 120 matching the search criteria. In another embodiment, the scan module 206 scans records 120 in the set of members 118 except for records 120 excluded by the search criteria.

The scan PDS utility 122 also includes a determination module 208 configured to determine whether a record 120 satisfies the search criteria and then to identify the record 120. Each record 120 in the set of members 118 that satisfies the search criteria is scanned and the determination module 208 identifies each record that matches corresponding expressions in the search criteria. The scan PDS utility 122 includes a return module 210 to return the records 120 identified by the determination module 208.

Figure 3:
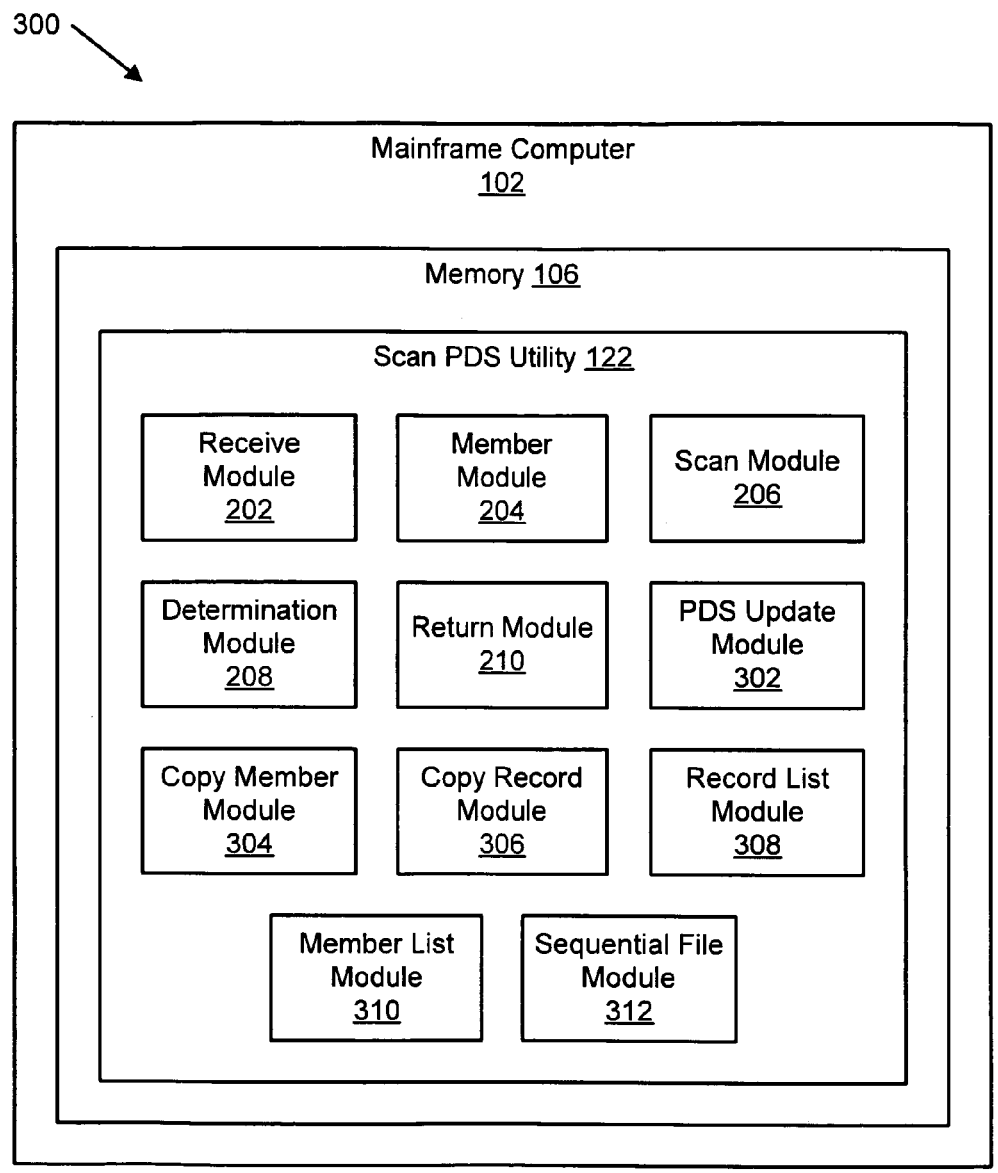
FIG. 3 is a schematic block diagram illustrating another embodiment of an apparatus for scanning a PDS in accordance with the present invention.

FIG. 3 is a schematic block diagram illustrating another embodiment of an apparatus 300 for scanning a PDS 116 in accordance with the present invention. The apparatus 300 includes a scan PDS utility 122 in a memory 106 on a mainframe computer 102 as described in relation to the apparatus 200 of FIG. 2. As in the apparatus 200 in FIG. 2, the scan PDS utility 122 includes a receive module 202, a member module 204, a scan module 206, a determination module 208, and a return module 210—all of which are described in relation to the apparatus 200 in FIG. 2.

The scan PDS utility 122 also includes a PDS update module 302 configured to generate a command to create one or more new PDS members 118 containing the records 120 returned by the return module 210. In one embodiment, the PDS update module 302 generates a command to create a new member in the PDS 116 that has been scanned. In another embodiment, the PDS update module 302 generates a command to create a new member in a PDS 116 other than the PDS 116 that has been scanned. In yet another embodiment, the PDS update module 302 creates one or more PDS members 118 containing the records 120 returned by the return module 210. For example, the PDS update module 302 may generate commands to create new PDS members 118 and then execute those commands.

The scan PDS utility 122 includes a copy member module 304 configured to generate a command to copy one or more PDS members 118 of the scanned PDS 116 containing at least one record 120 returned by the return module 210. In another embodiment, the copy member module 304 is configured to copy one or more PDS member 118 of the scanned PDS 116 containing at least one record 120 returned by the return module 210. For example, the copy member module 304 may generate commands to perform the member copy operation and then execute those commands. The scan PDS utility 122 includes a copy record module 306 configured to generate a command to copy records 120 returned by the return module 210 to one or more new members 118 in a new PDS 116. In another embodiment, the copy record module 306 is configured to copy records 120 returned by the return module 210 to one or more new members 118 in a new PDS 116. For example, the copy record module 306 may generate commands to perform the record copy operation and then execute those commands.

In one embodiment, the receive module 202, the member module 204, the scan module 208, the determination module 208, and the return module 210 are executed by a single TSO command or ISPF command. In a particular embodiment, the TSO command is called "SCANPDSX". In one embodiment, the PDS update module 302, the copy member module 304 and copy record module 306 comprise separate TSO commands that use the results of SCANPDSX. In another embodiment, SCANPDSX and the PDS update module 302, the copy member module 304 or the copy record module 306 are combined in a set of JCL commands. Advantageously, the scan PDS utility 122 is configured to generate control statements for executing the PDS update module 302, the copy member module 304, and/or the copy record module 308 based on user defined parameters. The scan PDS utility 122 may then automatically initiate execution of the PDS update module 302, the copy member module 304, and/or the copy record module 308 on the one or more determined records of the return module 210. In another embodiment, the PDS update module 302, the copy member module 304 or the copy record module 306 are configured to accept a search criteria and to internally invoke SCANPDSX before performing their respective operation.

Control statements for any typical data manipulation function can be generated by the scan PDS utility 122 along with the results of the return module 210. In one embodiment, a control statement uses the output of the return module 210 to create a new PDS in the form of a report. In another embodiment, a control statement uses the results of the return module 210 and the PDS update module 302 to replace one or more character strings in the records returned by the return module 210. One skilled in the art will recognize other control statements that may use the results of the return module 210.

The scan PDS utility 122 includes a record list module 308 configured to create a listing of the records 120 returned by the return module 210. In one embodiment, the list of returned records 120 is displayed on a terminal 108. In another embodiment, the list of returned records 120 may be stored in a file on a data storage device 112. In yet another embodiment, the list of returned records 120 is both displayed on a terminal 108 and stored on a data storage device 112. One skilled in the art will recognize other ways to store, display, or use the list of records 120 returned by the return module 201 from the record list module 308. For example, the list may be provided as in put to another utility for further processing.

The scan PDS utility 122 includes a member list module 310 to create a list of one or more members 118 that each include at least one record 120 returned by the return module 210. The scan PDS utility 122 may also include a sequential file module 312 to create a sequential file of records 120 returned by the return module 210. The sequential file may be a file with each record 120 organized in sequential order. The list of members with returned records 120 or the sequential file may be displayed on a terminal 108, stored on a data storage device 112, or a combination of both.

The return module 210 may return records and other information pertinent to scanning the PDS 116 in the form of a file, a list of records 120 and associated data, or data directly input to another function or program. One skilled in the art will recognize other data formats suitable for the return module 210 to return records 120. In one embodiment, the return module 210 returns which character string matched each returned record 120. In another embodiment, the return module 210 returns a location in a record 120 where a character string was found. In another embodiment, the return module 210 returns a list of the PDS members 118 which were evaluated, but did not contain records 120 matching the search criteria. In yet another embodiment, the return module 120 returns a summary report containing run statistics. One skilled in the art will recognize other data pertinent to a search and appropriate combinations of data and records 120.

The following logic is a specific embodiment used in one embodiment of the present invention:

```
RETCODE = 0
CALL PROCESS CONTROL STATEMENTS
READ PDS MEMBERS TO EVALUATE
IF FILE IS EMPTY
    THEN EVALUATE ALL PDS MEMBERS
    ELSE DO
        LISTPDS_FLAG = ON
        STORE ENTRIES IN LISTPDS ARRAY
    END
READ PDS MEMBERS TO EXCLUDE
IF FILE IS NOT EMPTY
    THEN STORE ENTRIES IN EXCLUDE PDSARRAY
READ SEARCH CHARACTER STRINGS
STORE ENTRIES IN STRING ARRAY
READ EXCLUSION CHARACTER STRINGS
STORE ENTRIES IN STRING ARRAY
CALL PROCESS CONTROL STATEMENTS
READ_INPUT_PDS
DO WHILE NOT EOD OF FILE
    CALL PROCESS RECORDS
    READ_INPUT_PDS
  END
  WRITE_SUMMARY REPORT
END OF PROCESSING
****************************************************************
PROCESS CONTROL STATEMENTS
   SET INDICATED ACTIVITY FLAGS
     (THESE INCLUDE IEBCOPY FLAG, IEBUPDTE FLAG, NOMATCH_FLAG,
      RECNOMATCH_FLAG, EXCLUDE_FLAG. ALIGN_FLAG, LOCATION,
      SEQ_FLAG, PDSLIST_FLAG)
   SET SEARCH COLUMN DELIMITERS, IF INDICATED
     (THESE INCLUDE MARGINL, MARGINR, SRCHCOL, EXCLCOL)
END PROCESS CONTROL STATEMENTS
****************************************************************
PROCESS RECORDS:
   CALL SELECT PDS MEMBER
   IF SELECT_FLAG = ON
```

```
        THEN DO
            IF PDSLIST_FLAG = ON
                THEN WRITE PDSLIST FILE FROM MEMBER NAME
            SET PDSMEMBER MATCH = OFF
            READ NEXT RECORD
            DO WHILE
                (NOT END OF MEMBER AND &
                RECORD MATCH CNT < MATCHLIM_CNT)
                SET FOUND_SEARCH = OFF
                RECORD MATCH CNT = 0
                CALL PROCESS SEARCH CRITERIA
                IF FOUND_SEARCH = ON
                    THEN DO
                            PDSMEMBER MATCH = ON
                            CALL PROCESS RECORD MATCH
                        END
                    ELSE CALL PROCESS RECORD NOMATCH
                READ NEXT RECORD
            END
            IF PDSMEMBER MATCH = ON
                THEN CALL PROCESS MEMBER MATCH
                ELSE CALL PROCESS MEMBER NOMATCH
END PROCESS RECORDS
**************************************************************
SELECT PDS MEMBER
    SET MEMBER SELECT FLAG OFF
    READ NEXT PDS MEMBER
    DO WHILE
    (MEMBER SELECT FLAG = OFF & NOT END OF FILE)
    SELECT
        WHEN MEMBER NAME IN EXCLUDE MEMBER ARRAY
            THEN NOP
        WHEN LISTPDS_FLAG = ON
            IF MEMBER NAME IN LIST ARRAY
            THEN SELECT_FLAG
        OTHERWISE
            SELECT_SW = ON
        END SELECT
        IF SELECT_FLAG = OFF
            THEN READ NEXT PDS MEMBER
    END DO WHILE
END SELECT PDS MEMBER
**************************************************************
PROCESS SEARCH CRITERIA
DO FOR ALL ENTRIES IN SEARCH ARRAY
    IF SEARCH STRING IN RECORD
        (BETWEEN DELIMITERS, IF SPECIFIED,
        OR IN COLUMN, IF SPECIFIED)
        THEN FOUND_SEARCH = ON
END
IF FOUND_SEARCH = ON
    THEN DO FOR ALL ENTRIES IN EXCLUDE STRING ARRAY
            IF EXCLUDE STRING IN RECORD
                THEN FOUND_SEARCH = OFF
        END
END PROCESS SEARCH CRITERIA
**************************************************************
PROCESS RECORD MATCH
    INCREMENT TOTAL MATCH CNT
    INCREMENT RECORD MATCH CNT
IF ALIGN_FLAG = ON
    LEFT JUSTING DATA IN RECORD
WRITE RECORD TO MATCH RECORD FILE
IF SEQ_FLAG = ON
    THEN DO
            INCREMENT SEQFILE_CNT
            IF EXCLUDE_FLAG = ON
                THEN REPLACE SEARCH STRING WITH BLANKS IN
                RECORD
            WRITE RECORD TO SEQFILE
        END
END PROCESS RECORD MATCH
**************************************************************
PROCESS RECORD NOMATCH
    INCREMENT RECORD NOMATCH CNT
    IF RECNOMATCH_FLAG = ON
        THEN DO
                WRITE FILE NOMATCHR FROM RECORD
                IF SEQ_FLAG = ON
```

-continued

```
                    THEN DO
                         INCREMENT SEQFILE_CNT
                         WRITE RECORD TO SEQFILE
                    END
         END
END PROCESS RECORD NOMATCH
************************************************************
PROCESS MEMBER MATCH
    INCREMENT PDS MATCH CNT
    IF IEBCOPY FLAG = ON
       THEN CREATE IEBCOPY CONTROL STATEMENTS
    IF IEBUPDTE FLAG =ON
       THEN CREATE IEBUPDTE CONTROL STATEMENTS
    WRITE MEMBER NAME TO MATCH FILE
END PROCESS MEMBER MATCH
************************************************************
PROCESS MEMBER NOMATCH
    INCREMENT PDS NOMATCH_CNT
    IF NOMATCH FLAG = ON
       THEN DO
                IF IEBCOPY FLAG = ON
                    THEN CREATE IEBCOPY CONTROL STATEMENTS
                IF IEBUPDTE FLAG =ON
                    THEN CREATE IEBUPDTE CONTROL STATEMENTS
                WRITE MEMBER NAME TO NOMATCH FILE
       END
END PROCESS MEMBER NOMATCH
************************************************************
```

Scan PDS Utility Keywords

| | |
|---|---|
| SRCHWORD | THE CHARACTER STRING BEING SEARCHED IS A COMPLETE WORD (VALUE: YES) |
| DELIMSTR | CHARACTER STRING USED AS DELIMITER WHEN SEARCH STRINGS HAVE EMBEDDED BLANKS (DEFAULTS TO '#') |
| ALIGN | LEFT-JUSTIFY THE OUTPUT RECORDS (VALUE: YES) |
| LOCATION | PRINT RECORD NUMBER WHICH MATCHES STRING (VALUE: YES) |
| EXCLUDE | EXCLUDE SEARCH STRING FROM OUTPUT (VALUE: YES) |
| MARGINL | LEFT MARGIN IN WHICH TO SEARCH (VALUE: NUMERIC) |
| MARGINR | RIGHT MARGIN IN WHICH TO SEARCH (VALUE: NUMERIC) |
| SRCHCOL | EXACT COLUMN IN WHICH TO SEARCH (VALUE: NUMERIC) |
| EXCLCOL | EXACT COLUMN IN WHICH EXCLUDE STRING IS FOUND (VALUE: NUMERIC) |
| MATCHLIM | IF THIS NUMBER OF MATCHES IS FOUND, BEGIN SEARCHING THE NEXT MEMBER |
| PDSLIST | LIST ALL OF THE MEMBERS IN THE PDS WHICH ARE GOING TO BE EVALUATED (VALUE: YES) |
| NOMATCH | WRITE THE NAMES OF MEMBERS IN WHICH NO MATCH WAS FOUND TO NOMATCH FILE |
| RECNOMATCH | WRITE RECORDS NOT MATCHING ANY STRING TO NOMATCH FILE (VALUE: YES) |

LIST
    PROCESS ONLY THOSE PDS MEMBERS IDENTIFIED AS
    INPUT THROUGH THE LISTIN DD STATEMENT. THIS PARAMETER
    IS ONLY USED TO DEBUG THE LIST PROCESS, AS A FINITE PDS
    LIST WILL AUTOMATICALLY BE USED IF THE LISTIN FILE IS NOT
    EMPTY. THE NAMES OF THE PDS MEMBERS MUST START IN
    COLUMN 1
IEBCOPY
    CREATE IEBCOPY INPUT FOR PDS MEMBERS CONTAINING
    SCANNED CHARACTERS (I.E. S MEMBER=XXXXXX)
    THE IEBCOPY STATEMENTS ARE WRITTEN TO THE FILE
    IDENTIFIED BY THE PDSLIST DD STATEMENT.
SEQ
    THIS COMMAND IS USED TO CREATE A SEQUENTIAL FILE FROM
    ALL OF THE RECORDS SELECTED FROM THE PDS MEMBERS.
    THE OUTPUT IS WRITTEN TO THE FILE IDENTIFIED BY THE
    SEQFILE DD STATEMENT.
IEBUPDTE
    CREATE IEBUPDTE INPUT FOR EACH MEMBER WRITTEN TO
    SEQFILE.
VALUES: 'YES' OR 'ADD' RESULT IN A NEW PDS MEMBER FOR
EACH SELECTED MEMBER

-continued

```
(I.E. "./ ADD LEVEL=00,SOURCE=0, LIST=ALL,NAME=XXXXXXXX")
VALUE: 'CHANGE' RESULTS IN A CHANGE TO AN EXISTING
RECORD IN A PDS FOR EACH SELECTED MEMBER
(I.E. "./ CHANGE SEQFLD=738,NAME=XXXXXXXX
    ./ DELETE SEQ1=XXXXXXXX,SEQ2=XXXXXXXX")
FOLLOWED BY THE CHANGED CHARACTER STRINGS
VALUE: 'DELETE' RESULTS IN A DELETE OF AN EXISTING
RECORD IN A PDS FOR EACH SELECTED MEMBER
(I.E. "./ CHANGE SEQFLD=738,NAME=XXXXXXXX
    ./ DELETE SEQ1=XXXXXXXX,SEQ2=XXXXXXXX")
```

Figure 4:
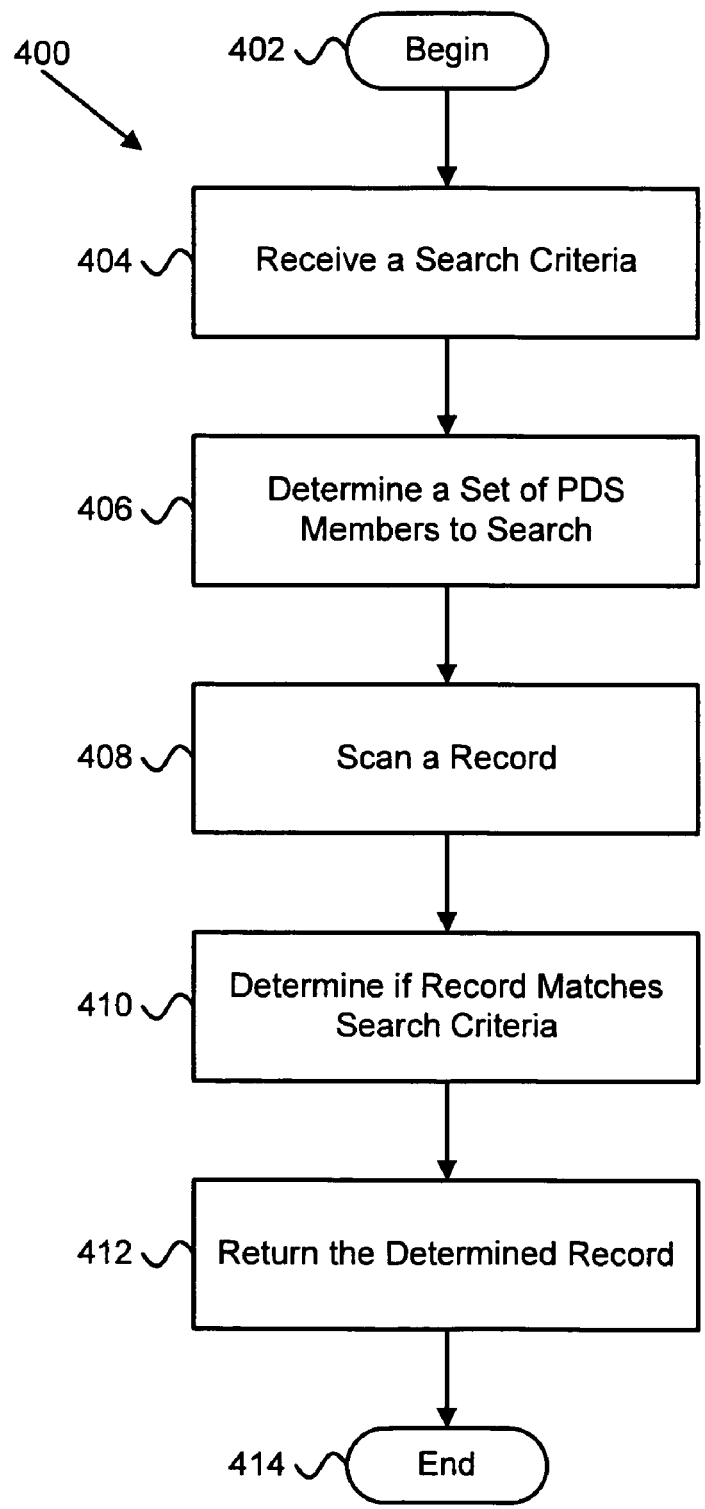
FIG. 4 is a schematic flow chart diagram illustrating one embodiment of a method for scanning a PDS in accordance with the present invention.

FIG. 4 is a schematic flow chart diagram illustrating one embodiment of a method 400 for scanning a PDS in accordance with the present invention. The method 400 begins 402 and the receive module 202 receives 404 a search criteria with one or more expressions. The search criteria may be received 404 from user input at a terminal 108 or from a file. The member module 204 determines 406 a set of PDS members 118 to search based on the search criteria. The scan module 206 then scans 408 a record 120 contained within each member 118 of the set of PDS members 118. The determination module 208 then determines 410 whether a record 120 satisfies the search criteria. The search criteria may include any number of expressions. An expression may include a specified character string and the determination module 208 identifies a record 120 with the specified character string. Alternatively, the expression may have an exclude expression such that the determination module 208 includes a record 120 if a specified character string is absent from the record 120. In another embodiment, the determination module 208 excludes a record 120 if a specified character string is present in the record 120. The return module 210 then returns 412 the records 120 identified by the determination module 208 and the method 400 ends 414.

Figure 5A:
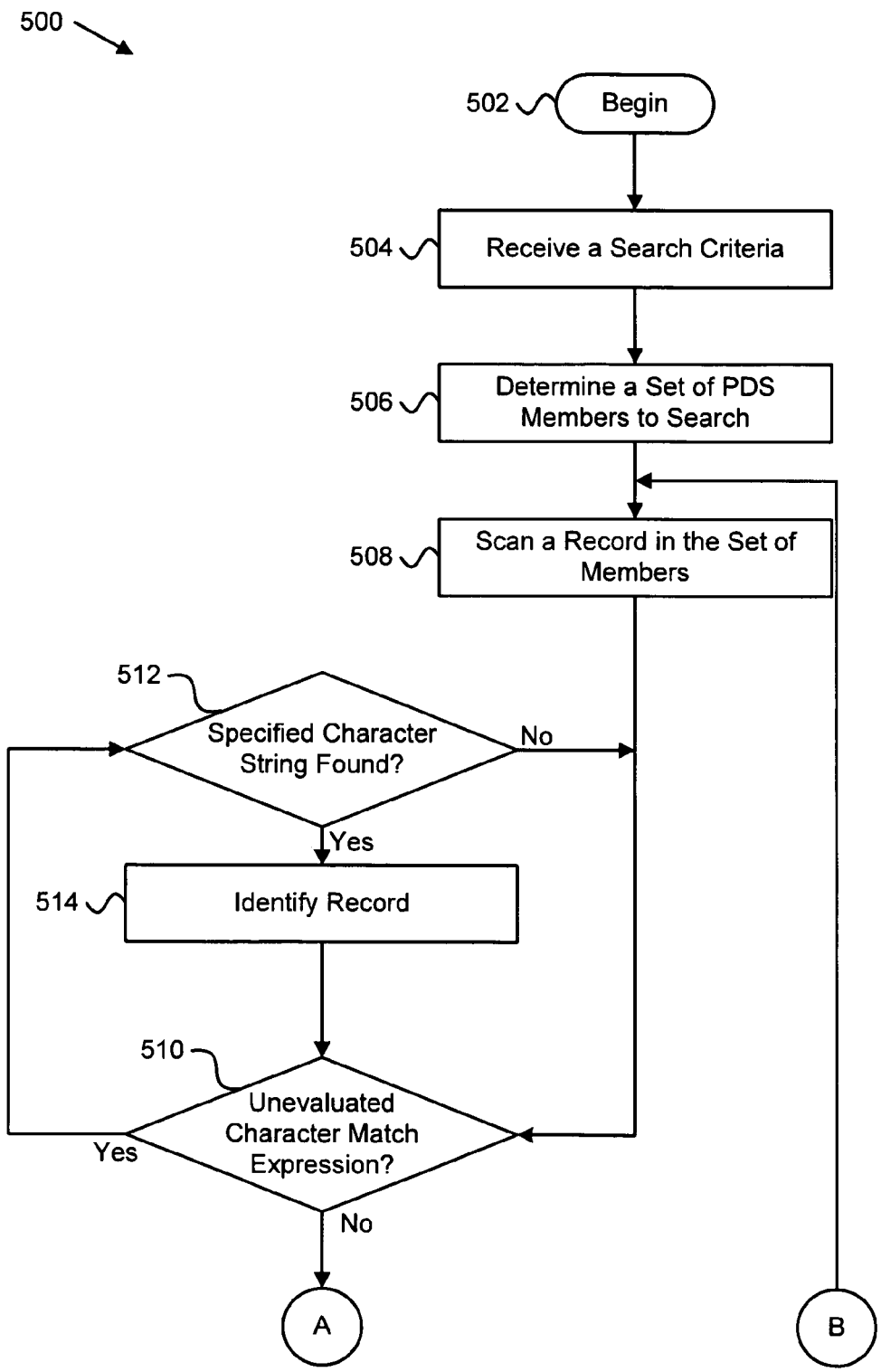
FIG. 5A is a schematic flow chart diagram illustrating part of another embodiment of a method for scanning a PDS in accordance with the present invention.
Figure 5B:
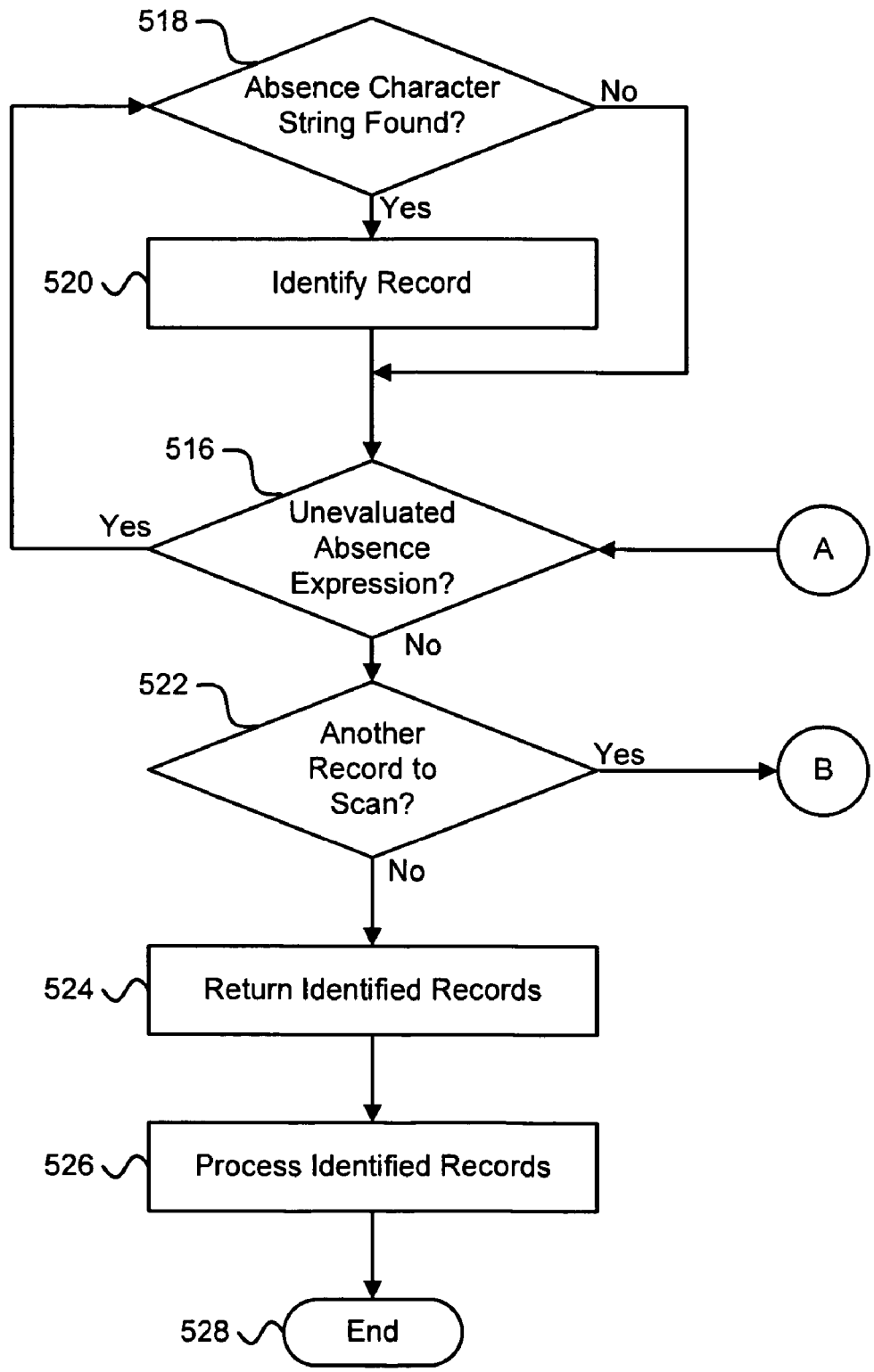
FIG. 5B is a schematic flow chart diagram illustrating part of another embodiment of a method for scanning a PDS in accordance with the present invention.

FIG. 5 is a schematic flow chart diagram illustrating another embodiment of a method 500 for scanning a PDS 116 in accordance with the present invention where the first part of the flow chart diagram is shown in FIG. 5A and the second part is shown in FIG. 5B. The method 500 begins 502 and the receive module 202 receives 504 a search criteria with one or more expressions. The member module 204 determines 506 a set of PDS 116 members 118 to search based on the search criteria. The scan module 206 then scans 508 a record 120 contained within each member 118 of the set of PDS members 118.

The determination module 208 then determines 510 whether there are any unevaluated character match expressions in the search criteria where a character match expression identifies a record 120 when a specified character string is found. If a character match expression is included in the search criteria, the determination module 208 determines 512 whether the record 120 contains a specified character string. If the specified character string is found, the determination module 208 identifies 514 the record 120a. If the determination module 208 determines 512 that the specified character string is not found in the record 120, the determination module 208 does not identify 514 the record 120. The determination module 208 then determines 510 if there are more unevaluated character match expressions to evaluate in the search criteria. If there are unevaluated character match expressions, the determination module 208 returns and determines 512 if the specified character string in the next character match expression is found.

If the determination module 208 finds there are no unevaluated character match expressions, determination module 208 then determines 516 if there are any absense expressions in the search criteria. (See FIG. 5A and follow connector A to FIG. 5B) If so, the determination module 208 then determines 518 if there is an absence of a specified character string in the record 120. If the specified character string is not found, the determination module 208 identifies 520 the record 120. If the determination module 208 determines 518 the specified character string is found, it does not identify 520 the record 120. The determination module 208 then determines 516 if there are any more unevaluated absence expressions. If so, the determination module 208 returns to determine 518 the next absence expression. If not, the determination module 208 determines 522 if there is another record 120 to scan. If so, the determination module 208 returns and the scan module 206 scans 508 the next record 120. (See FIG. 5B and follow connector B to FIG. 5A) If not, the return module 210 returns 524 the identified records 120. The identified records 120 are then processed 526 and the method 500 ends 528.

In one embodiment, the PDS update module 302 processes 526 the identified records 120 by copying the identified records 120 to a new member 118 in the PDS 116. In another embodiment, the PDS update module 302 processes the identified records 120 by generating commands to copy the identified records 120 to a new member 118 in the PDS 116. In another embodiment, the copy member module 304 processes 526 the identified records 120 by copying members 118 with the identified records 120 to a new PDS 116. In another embodiment, the copy member module 304 processes 526 the identified records 120 by generating commands to copy members 118 with the identified records 120 to a new PDS 116. In another embodiment, the copy record module 306 processes 526 the identified records 120 by copying the identified records 120 to one or more new members 118 in a new PDS 116. In another embodiment, the copy record module 306 processes 526 the identified records 120 by generating commands to copy the identified records 120 to one or more new members 118 in a new PDS 116.

In one embodiment, the record list module 308 processes 526 the identified records 120 by creating a list of the identified records 120. In another embodiment, the member list module 310 processes 526 the identified records 120 by creating a list of members 118 that include the identified records 120. In yet another embodiment, the sequential file module 312 processes 526 the identified records 120 by creating a sequential file with the identified records 120. One skilled in the art will recognize other ways to process the identified records 120 using control statements or the like.

The method 500 shown in FIGS. 5A and 5B demonstrates one embodiment where one record 120 is scanned using all the expressions in the search criteria before moving on to the next record 120 in the set of members 118 of the PDS 116. In another embodiment, all of the records 120 in the set of members 118 are evaluated using one expression in the search criteria before evaluating the next expression in the search criteria. In another embodiment, expressions are evaluated to identify a subset of records 120 satisfying the expressions and then one or more absense expressions are evaluated to identify records 120 from the subset of records 120 where a specified character string is absent. One skilled in the art will recognize other routines and combinations of expressions to scan a PDS 116 where the records 120 are of any defined length, any number of expressions are be included in a search criteria, and absense expressions are allowed for records 120 and members 118.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to scan a mainframe partitioned data set ("PDS"), the method comprising:
   receiving a search criteria comprising two or more expressions for searching a mainframe PDS, at least two of the expressions each comprising a character string to be identified within the mainframe PDS, wherein the mainframe PDS is generated by a mainframe computer system and wherein the mainframe PDS is a data structure comprising one or more members comprised of one or more records, the search criteria further comprising one or more member exclusion expressions that specify one or more members of the mainframe PDS for exclusion from the search;
   identifying a set of members from the mainframe PDS for scanning and excluding from the set of members one or more members specified by the member exclusion expressions;
   scanning one or more records contained within the identified one or more members of the mainframe PDS wherein records contained within members specified by the member exclusion expressions are excluded from the scanning;
   determining whether each scanned record satisfies the search criteria;
   returning one or more determined records;
   further comprising generating a command to create a new PDS member containing the determined record.

2. The method of claim 1, further comprising generating a command to copy one or more PDS members containing at least one determined record to a new PDS.

3. The method of claim 1, further comprising generating a command to copy one or more determined records to a new member in a new PDS.

4. The method of claim 1, wherein the search criteria comprises at least one expression that identifies a record that lacks a specified character string of at least one of the two or more expressions.

5. The method of claim 1, further comprising identifying a set of PDS members designated by the search criteria.

6. The method of claim 1, wherein the search criteria further comprises an expression configured to do one of exclude from the scan a specified number of characters from the beginning of the record or exclude from the scan a specified number of characters from the end of the record.

7. The method of claim 1, wherein the search criteria further comprises an expression to scan a specified column in the record.

8. The method of claim 1, wherein the search criteria further comprises an expression that identifies one or more records containing a first character string and that excludes from the one or more identified records a record containing a second specified character string.

9. The method of claim 1, further comprising a record list module configured to create a list of at least one determined record.

10. The method of claim 1, further comprising creating a list of one or more members that include at least one determined record.

11. The method of claim 1, further comprising generating a sequential file of at least one determined record.

12. The method of claim 1, further comprising reading a file containing the search criteria.

13. The method of claim 1, receiving the search criteria from a terminal.

14. The method of claim 1, wherein the search criteria contains an expression comprising a character string having a blank character.

15. The method of claim 1, wherein the receive module receives the search criteria through a terminal using an Interactive System Productivity Facility ("ISPF").

16. An apparatus for scanning a mainframe partitioned data set ("PDS") and processing the scan results to provide results to a client in a form requested by the client, the apparatus comprising:
   a processor and a memory;
   a scan PDS utility to scan a mainframe PDS to identify the records having the specified characteristic, the scan PDS utility comprising
   a receive module configured to receive a search criteria comprising two or more expressions for searching a mainframe PDS, wherein the mainframe PDS is generated by a mainframe computer system and wherein the mainframe PDS is a data structure comprising one or more members comprised of one or more records, wherein the search criteria is configured to identify the records having the specified characteristic;
   a member module configured to determine a set of PDS members to search based on the search criteria;
   a scan module configured to scan a record contained within each member of the set of PDS members;
   a determination module configured to determine whether a record satisfies the search criteria, wherein the search criteria comprises at least one expression that identifies a record that lacks a specified character string of the at least one expression; and
   a return module configured to return the determined record;
   a PDS update module configured generate a command to create a new PDS member; and
   a copy member module configured to generate a command to copy one or more PDS members containing at least one determined record to the new PDS.

17. A system to scan a mainframe partitioned data set ("PDS"), the system comprising:
   a processor;
   a terminal coupled to the processor and configured to permit a user to provide a search criteria; and
   a memory coupled to the processor, the memory comprising a scan PDS utility to scan a mainframe PDS, the scan PDS utility comprising a receive module configured to receive a search criteria comprising two or more expressions for searching a mainframe PDS, at least two of the expressions each comprising a character string to be identified within the mainframe PDS, wherein the mainframe PDS is generated by a mainframe computer system and wherein the mainframe PDS is a data structure comprising one or more members comprised of one or more records;

a member module configured to determine a set of PDS members to search based on the search criteria and load the set of PDS members into the memory;

a scan module configured to scan a record contained within each member of the set of PDS members in the memory;

a determination module configured to determine whether a record satisfies the search criteria, wherein the search criteria comprises at least one expression that identifies a record that lacks a specified character string of the at least one expression;

a return module configured to return the determined record and present the determined record using the terminal a PDS update module configured to create a new PDS member; and a copy member module configured to copy one or more PDS members containing at least one determined record to the new PDS.

18. The system of claim 17, wherein each scanned record in the mainframe PDS has a length within a range supported by an operating system maintaining the scanned PDS, the scan PDS utility configured to support a plurality of different record lengths.

19. A computer readable storage medium tangibly embodying a program of machine-readable instructions executable by a digital processing apparatus to perform an operation to scan a mainframe partitioned data set ("PDS"), the operation comprising:

receiving a search criteria comprising two or more expressions for searching a mainframe PDS, at least two of the expressions each comprising a character string to be identified within the mainframe PDS, wherein the mainframe PDS is generated by a mainframe computer system and wherein the mainframe PDS is a data structure comprising one or more members comprised of one or more records;

scanning one or more records contained within one or more members of the mainframe PDS wherein records contained within members specified by the member exclusion expressions are excluded from the scanning;

determining whether each scanned record satisfies the search criteria;

returning one or more determined records;

generating a command to create a new PDS member containing the determined record; and generating a command to copy one or more PDS members containing at least one determined record to a new PDS.

20. The computer readable storage medium of claim 19, wherein the search criteria designates PDS members to be excluded from the search.

21. The computer readable storage medium of claim 19, wherein the search criteria further comprises an expression that identifies one or more records containing a first character string and that excludes from the one or more identified records a record containing a second specified character string.

22. The computer readable storage medium of claim 19, further comprising an operation to create a list of one or more members that include the at least one determined record.

23. The computer readable storage medium of claim 19, further comprising an operation to generate a sequential file of at least one determined record.

24. The computer readable storage medium of claim 19, wherein receiving a search criteria further comprises reading a file containing the search criteria.

25. The computer readable storage medium of claim 19, wherein receiving a search criteria further comprises receiving the search criteria from a terminal.

* * * * *